United States Patent
Rouleau et al.

(10) Patent No.: US 6,475,464 B1
(45) Date of Patent: Nov. 5, 2002

(54) PROCESS FOR PREPARING A ZEOLITE WITH STRUCTURE TYPE MTT USING ZEOLITIC MATERIAL SEEDS

(75) Inventors: Loïc Rouleau, Oullins; Frédéric Kolenda, Francheville le Haut; Eric Benazzi, Chatou, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/672,052

(22) Filed: Sep. 29, 2000

(30) Foreign Application Priority Data

Sep. 29, 1999 (FR) ............................................. 99 12267

(51) Int. Cl.[7] .......................... C01B 39/48; C07C 5/333
(52) U.S. Cl. ............... 423/708; 423/709; 423/DIG. 36; 585/654
(58) Field of Search ................................. 423/708, 709, 423/DIG. 36; 502/60, 74; 585/654

(56) References Cited

U.S. PATENT DOCUMENTS

| | | | | |
|---|---|---|---|---|
| 4,076,842 A | * | 2/1978 | Plank et al. | |
| 4,650,655 A | | 3/1987 | Chu et al. | |
| 4,868,146 A | * | 9/1989 | Chu et al. | |
| 5,053,373 A | * | 10/1991 | Zones | |
| 5,063,038 A | * | 11/1991 | Kirker et al. | |
| 5,147,838 A | * | 9/1992 | Marler et al. | .................. 502/71 |
| 5,321,194 A | | 6/1994 | Apelian et al. | |
| 5,707,601 A | * | 1/1998 | Nakagawa | .................. 423/701 |

* cited by examiner

Primary Examiner—David Sample
(74) Attorney, Agent, or Firm—Millen, White, Zelano & Branigan, P.C.

(57) ABSTRACT

The present invention concerns a process for preparing a zeolite with structure type MTT comprising at least one element X selected from silicon and germanium and at least one element T selected from iron, aluminium, gallium, boron, titanium, vanadium, zirconium, molybdenum, arsenic, antimony, chromium and manganese, characterized in that seeds of at least one zeolitic material are used comprising at least one element X' selected from silicon and germanium and at least one element T' selected from iron, aluminium, gallium, boron, titanium, vanadium, zirconium, molybdenum, arsenic, antimony, chromium and manganese, said seeds being different from the zeolite with structure type MTT being synthesised. The present invention also concerns the use of the zeolite obtained as a catalyst in a process for converting hydrocarbon-containing feeds, as an adsorbent to control pollution and as a molecular sieve for separation.

12 Claims, No Drawings

PROCESS FOR PREPARING A ZEOLITE WITH STRUCTURE TYPE MTT USING ZEOLITIC MATERIAL SEEDS

TECHNICAL FIELD

The present invention relates to a novel process for preparing zeolites with structure type MTT. This zeolite generally has the following formula in the anhydrous form: 0 to 20 $R_2O$: 0–10 $T_2O_3$: $100XO_2$ where R represents a monovalent cation or 1/n of a cation with valency n, X represents silicon and/or germanium, T represents at least one element selected from aluminium, iron, gallium, boron, titanium, vanadium, zirconium, molybdenum, arsenic, antimony, chromium and manganese.

Zeolites with structure type MTT such as ZSM-23 zeolite are generally synthesised by mixing, in an aqueous medium, at least one source of silica and/or germanium and at least one source of at least one element selected from aluminium, iron, gallium, boron, titanium, vanadium, zirconium, molybdenum, arsenic, antimony, chromium and manganese in the presence of an organic nitrogen-containing compound acting as a template, or precursors of the organic compound. The mixture is generally maintained at a certain temperature until the zeolite crystallises.

PRIOR ART

ZSM-23 zeolite with structure type MTT, which has already been described in the prior art, has a unidimensional microporous framework, with a pore diameter of 4.5×5.2 Å (1 Å=1 Angström=$1\times10^{-10}$ m) ("Atlas of Zeolite Structure Types", W. M. Meier and D. H. Olson, $4^{th}$ edition, 1996). Further, A. C. Rohmann et al (Zeolites, 5, 352, 1985), J. L. Schenker et al (private communication, 1992) and B. Marler et al (J. Appl. Cryst. 26; 636, 1993) have stated that the crystalline lattice has orthorhombic symmetry ($Pmn2_1$, a=21.5 Å, b=11.1 Å, c=5.0 Å) with channels parallel to axis c, delimited by rings of 10 tetrahedra. The synthesis mode and physico-chemical characteristics of ZSM-23 zeolite have been described in a variety of patents which differ in the nature of the organic template used. That zeolite can be synthesised using at least one organic template selected from pyrrolidine (U.S. Pat. No. 4,076,842), diisopropanolamine (British patent GB-A-2 190 910), quaternary ammonium compounds such as heptamethonium bromide (U.S. Pat. No. 4,490,342), octamethonium bromide (GB-A-2 202 838), dodecamethonium bromide (U.S. Pat. No. 5,405,596) and quaternary triammonium compounds (U.S. Pat. No. 5,332,566). The mode of synthesis comprises mixing an oxide, generally a silicon oxide, and an oxide, generally an aluminium oxide, in the presence of the template.

Other zeolites have structure type MTT and differ from ZSM-23 zeolite in the mode of preparation, in particular in the organic template used. These are EU-13 zeolite (European patent EP-A-0 108 486), using a quaternary methylated ammonium or phosphonium salt, ISI-4 zeolite (EP-A-0 102 497) using ethylene glycol or a monoethanolamine, SSZ-32 zeolite (U.S. Pat. No. 4,483,835) using imidazole derivatives or KZ-1 zeolite using a variety of amines (L. M. Parker et al., Zeolites, 3, 8, 1988).

SUMMARY OF THE INVENTION

The present invention concerns a process for preparing a zeolite with structure type MTT comprising at least one element X selected from silicon and germanium and at least one element T selected from iron, aluminium, gallium, boron, titanium, vanadium, zirconium, molybdenum, arsenic, antimony, chromium and manganese, characterized in that seeds of at least one zeolitic material comprising at least one element X' selected from silicon and germanium and at least one element T' selected from iron, aluminium, gallium, boron, titanium, vanadium, zirconium, molybdenum, arsenic, antimony, chromium and manganese is used, said seeds being different from the zeolite with structure type MTT which is prepared.

IMPORTANCE OF THE INVENTION

The process of the invention can reduce the crystallisation time of the MTT zeolite after forming the mixture, to achieve a maximum yield of pure product, which reduces the costs. The reaction medium composition can have a wider range, which increases flexibility.

Thus, the Applicant has discovered that synthesis of a zeolite with structure type MTT characterized by using seeds of at least one zeolitic material different from the material to be synthesised can achieve the advantages cited above, i.e., an advantage as regards time, pure product yield and flexibility in reaction mixture composition.

DESCRIPTION OF THE INVENTION

The invention concerns a process for preparing a zeolitic material with structure type MTT comprising at least one element X selected from silicon and germanium and at least one element T selected from iron, aluminium, gallium, boron, titanium, vanadium, zirconium, molybdenum, arsenic, antimony, chromium and manganese, characterized in that seeds of at least one zeolitic material comprising at least one element X' selected from silicon and germanium and at least one element T' selected from iron, aluminium, gallium, boron, titanium, vanadium, zirconium, molybdenum, arsenic, antimony, chromium and manganese is used, said seeds being different from the zeolite with structure type MTT which is prepared.

The difference between the zeolite with structure type MTT which is to be synthesised and the zeolitic material introduced as seeds lies either in the difference in structure type, or in the difference in chemical composition of the crystalline framework, or in the difference in structure type and the difference in chemical composition of the crystalline framework.

The preparation process of the invention comprises mixing, in an aqueous medium, at least one source of at least one element X selected from silicon and germanium, at least one source of at least one element T selected from aluminium, iron, gallium, boron, titanium, vanadium, zirconium, molybdenum, arsenic, antimony, chromium and manganese, at least one nitrogen-containing organic compound Q selected from alkylated polymethylene α-ω diammonium derivatives, precursors corresponding to said organic compound Q, and seeds S of a zeolitic material. The invention is characterized in that the seeds used comprise at least one zeolitic material different from the MTT zeolite which is to be prepared. Reaction of the mixture is maintained until the zeolite crystallises.

The alkylated polymethylene α-ω diammonium derivative acting as a template, used more particularly for the synthesis of ZSM-23 zeolite, is defined by the formula: $R_1R_2R_3N^+(CH_2)_nN^+R_4R_5R_6$, n being in the range 3 to 14 and $R_1$ to $R_6$, which may be identical or different, representing alkyl or hydroxyalkyl radicals containing 1 to 8 carbon atoms; up to five $R_1$ to $R_6$ radicals can be hydrogen.

Thus it is possible to use seeds of at least one solid with structure type LTA such as A zeolite, with structure type LTL, structure type FAU such as X and Y zeolites, structure type MOR, structure type MAZ, structure type OFF, structure type FER, structure type ERI, structure type BEA, structure type MFI such as ZSM-5 and silicalite, structure type MTW, structure type EUO, structure type LEV, structure type TON, structure type NES such as NU-87 zeolite, or a NU-85, NU-86, NU-88 or IM-5 zeolite or a zeolite with structure type MTT with a chemical composition of the crystalline framework which is different from the chemical composition of the crystalline framework of the MTT zeolite to be prepared, in particular with different X'/T' ratios. Preferably, the seeds for synthesising a zeolite with structure type MTT are constituted by seeds of zeolites with structure type LTA, FAU, MOR, MFI, MTT, the seeds with structure type MTT having an X'/T' ratio which is different from that of the zeolite which is synthesised.

The zeolitic materials acting as seeds can be introduced at any point in the preparation of the zeolite which is to be synthesised. The seeds can be introduced at the same time as the sources of the elements X and T, or as organic template Q, or the seeds can be introduced first into the aqueous mixture, or the seeds can be introduced after introducing the sources of elements X and T and the template. Preferably, the seeds are introduced after at least partial homogenisation of the aqueous mixture containing sources of elements X and T and the template.

The zeolitic materials acting as seeds can be introduced during synthesis of the zeolite which is to be synthesised in a number of forms. The seeds can be introduced after having undergone at least one of the steps selected from the following steps: washing, drying, calcining and ion exchange. The seeds can also be introduced in the as synthesised form.

The seed particle size can have an influence on the synthesis process and must preferably have the desired size. The term "zeolite seed particle" means either a zeolite crystal or an aggregate of zeolite crystals. Thus the size of at least the major portion of the seed particles introduced during preparation of the zeolitic material is in the range 0.001 to 500 $\mu$m, preferably in the range 0.005 to 250 $\mu$m.

In one particular implementation, independent or otherwise of the preceding implementation, it may be advantageous to add at least one alkali metal or ammonium salt P to the reaction medium. Examples which can be cited are strong acid radicals such as bromide, chloride, iodide, sulphate, phosphate or nitrate, or weak acid radicals such as organic acid radicals, for example citrate or acetate. This salt can accelerate crystallisation of MTT zeolites from the reaction mixture.

In the process of the invention, the reaction mixture generally has the following composition, expressed in the oxide form:

| | |
|---|---|
| $XO_2/T_2O_3$ (mol/mol) | at least 10 |
| $OH^-/XO_2$ (mol/mol) | 0.002 to 2.0 |
| $Q/XO_2$ (mol/mol) | 0.002 to 2.0 |
| $Q/M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0.0001 to 0.1 |

Preferably, the reaction mixture has the following composition, expressed in the oxide form:

| | |
|---|---|
| $XO_2/T_2O_3$ (mol/mol) | at least 12 |
| $OH^-/XO_2$ (mol/mol) | 0.005 to 1.5 |
| $Q/XO_2$ (mol/mol) | 0.005 to 1.5 |
| $Q/M^+ + Q)$ (mol/mol) | 0.1 to 1.0 |
| $H_2O/XO_2$ (mol/mol) | 3 to 250 |
| $P/XO_2$ (mol/mol) | 0 to 1 |
| $S/XO_2$ (g/g) | 0.0005 to 0.07 | and still more preferably, the reaction mixture has the following composition, expressed in the oxide form:

| | |
|---|---|
| $XO_2/T_2O_3$ (mol/mol) | at least 15 |
| $OH^-/XO_2$ (mol/mol) | 0.01 to 1 |
| $Q/XO_2$ (mol/mol) | 0.01 to 1 |
| $Q/M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0.001 to 0.04 | where
- X is silicon and/or germanium,
- T is at least one element selected from aluminium, iron, gallium, boron, titanium, vanadium, zirconium, molybdenum, arsenic, antimony, chromium and manganese;
- $M^+$ represents an alkali metal or an ammonium ion;
- Q represents the organic template or the decomposition products corresponding to said derivative or precursors of said derivative;
- S represents zeolite seeds expressed in their as synthesised, dried, calcined or exchanged form with an X'/T' ratio of less than 200;
- P represents the alkali metal or ammonium salt.

M and/or Q can be present in the form of hydroxides or salts of inorganic or organic acids provided that the $OH^-/XO_2$ criterion is satisfied.

The quantity of seeds introduced with respect to the quantity of oxide $XO_2$ is in the range 0.001% to 10%, preferably in the range 0.05% to 7%, more preferably in the range 0.1% to 4%.

The synthesis of the MTT zeolite using the process of the present invention is carried out using an organic compound Q acting as a template.

When synthesising ZSM-23 zeolite, the preferred starting alkylated polymethylene α-ω diammonium derivatives Q are, inter alia, alkylated derivatives of heptamethylene α-ω-diammonium, octamethylene α-ω-diammonium, undecamethylene α-ω-diammonium, dodecamethylene α-ω-diammonium and especially methylated derivatives of heptamethylene α-ω diammonium, octamethylene α-ω-diammonium, undecamethylene α-ω-diammonium, dodecamethylene α-ω-diammonium derivatives, more preferably still 1,7-N,N,N,N',N',N',- hexamethylheptamethylene α-ω diammonium salts, 1,8-N,N,N,N',N',N',- hexamethyloctamethylene α-ω diammonium salts, 1,11-N,N,N,N',N',N',- hexamethylundecamethylene α-ω diammonium salts, 1,12-N,N,N,N',N',N',-hexamethyldodecamethyl α-ω diammonium salts, for example the halide, hydroxide, sulphate, silicate or aluminate.

The alkylated polymethylene α-ω diammonium derivatives can be obtained from precursors. Suitable precursors of the starting alkylated polymethylene α-ω diammonium derivatives are in particular the related diamines together with alcohols, alkyl halides, alkanediols or the related alkane dihalides together with alkylamines. They can be mixed as they are with the other reactants or they can be preheated together in the reaction vessel, preferably in solution before adding the other reactants necessary for synthesis of the MTT zeolite.

The preferred alkali metal ($M^+$) is sodium. The preferred element X is silicon. The preferred element T is aluminium.

The silicon source can be any one in normal use envisaged for zeolite synthesis, for example solid powdered silica, silicic acid, colloidal silica or dissolved silica. Powdered silicas which can be used include precipitated silicas, in particular those obtained by precipitation from a solution of an alkali metal silicate such as "Zeosil" or "Tixosil" produced by Rhone-Poulenc, fumed silicas such as "Aerosil" produced by Degussa and "Cabosil" produced by Cabot, and silica gels. Colloidal silicas with a variety of granulometries can be used, such as those sold under trade marks "LUDOX" from Dupont, and "SYTON" from Monsanto.

Particular dissolved silicas which can be used are commercially available soluble glasses or silicates containing 0.5 to 6.0 and in particular 2.0 to 4.0 moles of $SiO_2$ per mole of alkali metal oxide and silicates obtained by dissolving silica in an alkali metal hydroxide, a quaternary ammonium hydroxide or a mixture thereof.

More advantageously, the aluminium source is sodium aluminate, but it can also be aluminium, an aluminium salt, for example a chloride, nitrate or sulphate, an aluminium alcoholate or alumina itself which should preferably be in a hydrated or hydratable form, such as colloidal alumina, pseudoboehmite, boehmite, gamma alumina or a trihydrate.

Mixtures of the sources cited above can be used. Combined sources of silicon and aluminium can also be used, such as amorphous silica-aluminas or certain clays.

The reaction mixture is normally caused to react under autogenous pressure, optionally adding a gas, for example nitrogen, at a temperature in the range 85° C. to 250° C. until zeolite crystals form, which can take from 1 minute to several months depending on the reactant composition, the mode of heating and the mixture, the working temperature and the degree of stirring. Stirring is optional but preferable, as it reduces the reaction time. When the reaction is over, the solid phase is collected on a filter and washed and is then ready for subsequent operations such as drying, calcining and ion exchange.

To obtain the hydrogen form of the MTT zeolite, ion exchange can be carried out using an acid, in particular a strong mineral acid such as hydrochloric, sulphuric or nitric acid, or with an ammonium compound such as ammonium chloride, sulphate or nitrate. Ion exchange can be carried out by diluting once or more with the ion exchange solution. The zeolite can be calcined before or after ion exchange or between two ion exchange steps, preferably before ion exchange to eliminate all absorbed organic substances, provided that ion exchange is thereby facilitated.

As a general rule, the cation or cations of the zeolite with structure type MTT can be replaced by one or more cations of any metal, in particular those from groups IA, IB, IIA, IIB, IIIA and IIIB (including the rare earths), VIII (including the noble metals), also lead, tin and bismuth (the periodic table is that shown in the "Handbook of Physics and Chemistry", $76^{th}$ edition). Exchange is carried out using any water-soluble salt containing the appropriate cation.

The present invention also concerns the use of the zeolite prepared using the process of the present invention as an adsorbent to control pollution, as a molecular sieve for separation and as an acidic solid for catalysis in the fields of refining and petrochemistry.

As an example, when it is used as a catalyst, the MTT zeolite can be associated with an inorganic matrix which can be inert or catalytically active, and with an active phase. The inorganic matrix can be present simply as a binder to keep the small particles of zeolite together in the different known forms of catalysts (extrudates, beads, powders), or it can be added as a diluent to impose a degree of conversion on a process which would otherwise proceed at too high a rate leading to clogging of the catalyst as a result of increased coke formation. Typical inorganic diluents are support materials for catalysts such as silica, the different forms of alumina and kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds.

The zeolite with structure type MTT can also be associated with at least one other zeolite and acts as the principal active phase or as an additive.

The inorganic matrix can be a mixture of different compounds, in particular an inert phase and an inorganic phase.

The metallic phase is introduced into the zeolite alone, the inorganic matrix alone or into the inorganic matrix-zeolite ensemble, by ion exchange or impregnation with cations or oxides selected from the following: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

Catalytic compositions comprising the zeolite with structure type MTT can be applied to isomerisation, transalkylation and dismutation, alkylation and dealkylation, hydration and dehydration, oligomerisation and polymerisation, cyclisation, aromatisation, cracking and hydrocracking, reforming, hydrogenation and dehydrogenation, oxidation, halogenation, amine synthesis, hydrodesulphurisation and hydrodenitrogenation, catalytic elimination of oxides of nitrogen, ether formation and hydrocarbon conversion and to the synthesis of organic compounds in general, these reactions involving saturated and unsaturated aliphatic hydrocarbons, aromatic hydrocarbons, oxygen-containing organic compounds and organic compounds containing nitrogen and/or sulphur, also organic compounds containing other functional groups.

More particularly, the invention concerns the use of a zeolite with structure type MTT as a catalyst for isomerising straight chain paraffins.

Isomerisation (hydroisomerisation) of straight chain paraffins containing 4 to 8 carbon atoms per molecule can be carried out with bifunctional catalysts, combining an acidic function with a hydrodehydrogenating function.

The catalyst of the invention comprising at least one zeolite with structure type MTT can be used in any process for isomerisation (or hydroisomerisation) of $C_5$–$C_{10}$ paraffins, preferably $C_7$–$C_{10}$, more preferably $C_7$–$C_9$ and still more preferably $C_7$–$C_8$. The catalyst of the invention is particularly suitable for a process for preparing gasoline with a high octane number, combining catalytic isomerisation and separation.

More particularly, it is suitable for the process described in French patent application FR 97/14891, which comprises an isomerisation section and at least one section for separating dibranched and tribranched paraffins.

The MTT zeolite based catalyst of the invention contains at least one matrix in an amount in the range 1% to 90%, preferably in the range 5% to 90%, more preferably in the range 10% to 85%.

Non limiting examples of matrices used to form the catalyst are alumina gel, alumina, magnesia, amorphous silica-alumina, and mixtures thereof. Techniques such as extrusion, pelletisation or bowl granulation can be employed to carry out the forming operation.

The catalyst also includes a hydrodehydrogenating function ensured, for example, by at least one element from group VIII, preferably at least one element selected from the group formed by platinum and palladium. The quantity of non noble group VIII metal with respect to the final catalyst is in the range 1% to 40% by weight, preferably in the range 10% to 30%. In this case, the non noble metal is usually associated with at least one group VIB metal (preferably Mo or W). If at least one noble group VIII metal is used, the quantity used with respect to the final catalyst is less than 5% by weight, preferably less than 3% by weight, more preferably less than 1.5%.

When using noble group VIII metals, the platinum and/or palladium are preferably localised on the matrix, defined as above.

Isomerisation (hydroisomerisation) is carried out in at least one reactor. The temperature is in the range 150° C. to 350° C., preferably in the range 200° C. to 300° C., and the partial pressure of hydrogen is in the range 0.1 to 7 MPa, preferably in the range 0.5 to 5 MPa. The space velocity is in the range 0.2 to 10 liters of liquid hydrocarbons per liter of catalyst per hour, preferably in the range 0.5 to 5 liters of liquid hydrocarbons per liter of catalyst per hour. The hydrogen/feed mole ratio at the reactor inlet is such that the hydrogen/feed mole ratio in the effluent leaving the reactor is generally more than 0.01, preferably in the range 0.01 to 50, more preferably in the range 0.06 to 20. The invention will now be illustrated by the following examples.

EXAMPLES 1 TO 8

The following examples illustrate the synthesis of a ZSM-23 zeolite with an Si/Al ratio of close to 18 with octamethonium bromide as the organic template and zeolite seeds with a different structure and/or Si/Al ratio.

Examples 1 and 2 correspond to syntheses carried out without adding seeds, for comparison. Examples 3 to 7 correspond to syntheses carried out with zeolite seeds the characteristics of which are reported below.

The zeolites added as seeds were in different cationic forms (Na, $NH_4$, $NH_4$+Octa, Na+Deca, H) and in the form of particles with different sizes (3 to 115 μm for the mean diameter, Dv,50). These seeds were different from the synthesised solid ZSM-23 as regards their structure type and/or Si/Al ratio.

| Examples | Zeolite | Seeds Structure type | Si/Al (mol/mol) | Form (cations) | Dv, 10 (μm) | Dv, 50 (μm) | Dv, 90 (μm) |
|---|---|---|---|---|---|---|---|
| 1 (comparative) | | | | No seeds | | | |
| 2 (comparative) | | | | No seeds | | | |
| 3 (invention) | ZSM-5 | MFI | 27.7 | H | 48 | 115 | 205 |
| 4 (invention) | X | FAU | 1.3 | Na | 1.3 | 3.4 | 8.7 |
| 5 (invention) | Y | FAU | 2.8 | $NH_4$ | 1.4 | 3.1 | 7.0 |
| 6 (invention) | Mordenite | MOR | 118 | H | 5.1 | 15 | 26 |
| 7 (invention) | NU-87 | NES | 17.0 | Na + Deca | 7 | 23 | 36 |
| 8 (invention) | ZSM-23 | MTT | 57 | Na + Octa | 5 | 19 | 29 |

Octa = octamethonium

Deca = decamethonium

Dv,X = diameter of the equivalent sphere of particles where X% by volume of particles have a size less than that diameter.

The synthesis mixture had the following composition:

| | |
|---|---|
| $SiO_2$ (mol) | 60 |
| $Al_2O_3$ (mol) | 1.5 |
| $Na_2O$ (mol) | 9 |
| $OctaBr_2$ (mol) | 10 |
| $H_2O$ (mol) | 3000 |
| Seeds/$SiO_2$ (g/g) | 0 (ex. 1 & 2), or 0.04 (ex. 3 to 8) |

$OctaBr_2$ = octamethonium bromide = $Me_3N(CH_2)_8NMe_3^{2+}(Br^-)_2$ $OctaBr_2$ = octamethonium bromide = $Me_3N(CH_2)_8NMe_3^{2+}(Br^-)_2$ A solution A composed of silica and template was prepared by diluting octamethonium bromide (Fluka, 97%) in 80% of the water necessary to form a gel then adding colloidal silica sol (Ludox HS40, Dupont, 40% $SiO_2$). Solid sodium hydroxide (Prolabo, 99%) and solid sodium aluminate (Prolabo, 46% $Al_2O_3$, 33% $Na_2O$) were then dissolved in 10% of the water necessary to form a gel to form a solution B. Solution B was added to solution A with stirring, then the remaining water (10%). Mixing was carried out until the medium was homogeneous and dry zeolite seeds were added. The resulting mixture was reacted in a 125 ml autoclave with stirring at 180° C. under autogenous pressure, until the zeolite crystallised. After cooling, the product was filtered and washed with 0.5 liters of demineralised water then dried in a ventilated oven at 120° C.

The results of X ray diffraction and chemical analysis are shown in following table, as a function of the crystallisation conditions.

| Examples | Temperature (° C.) | Time (d) | ZSM-23 (%, XRD) | Si/Al (mol/mol, XF) | Yield (%) |
|---|---|---|---|---|---|
| 1 (comparative) | 180 | 12 | 100 | 18.9 | 4.7 |
| 2 (comparative) | 180 | 8.1 | 25 (+AMO) | nd | 4.9 |
| 3 (invention) | 180 | 8.1 | 101 | 18.5 | 4.8 |

-continued

| Examples | Temperature (° C.) | Time (d) | ZSM-23 (%, XRD) | Si/Al (mol/mol, XF) | Yield (%) |
|---|---|---|---|---|---|
| 4 (invention) | 180 | 8.1 | 98 | 18.6 | 4.6 |
| 5 (invention) | 180 | 8.1 | 100 | 18.3 | 4.5 |
| 6 (invention) | 180 | 8.1 | 102 | 18.2 | 4.7 |
| 7 (invention) | 180 | 8.1 | 100 | 17.8 | 4.8 |
| 8 (invention) | 180 | 8.1 | 101 | 18.6 | 4.6 |

AMO: amorphous
XRD: X ray diffraction, using Example 1 as the reference;
XF: X ray fluorescence The use of different zeolites with a structural type or a Si/Al ratio which was different from that of the synthesised ZSM-23 as seeds (Examples 3 to 8) led to pure ZSM-23 zeolite (100±3% crystallinity, Si/Al ratio close to 18), with a maximum yield (about 5%) in 8 days at 180° C. Under identical conditions, the experiment with no seed addition (Example 2) did not produce ZSM-23 zeolite completely. Then in Example 1, synthesis had to be continued for 12 days to allow pure ZSM-23 zeolite to be formed with a maximum yield.

EXAMPLE 9

Preparation of Catalyst C1, in Accordance with the Invention

The ZSM-23 was prepared in accordance with Example 5. The synthesised solid was calcined in dry air for 12 h at 550° C., then three successive ion exchange steps were carried out using an ammonium nitrate solution to obtain the $NH_4^+$ form of the zeolite.

To this end, 10 grams of the ZSM-23 zeolite from Example 5 was suspended in 100 ml of a solution of ammonium nitrate (5 M) then stirred under reflux for 2 hours. The solid was then filtered and washed. This cycle of treatment was repeated two more times. The solid obtained was dried at 60° C. for 10 hours.

After treatment, the Si/Al ratio of the ZSM-23 zeolite was 18.7 with an Na content of the order of 15 ppm by weight.

The zeolite prepared as above was then mixed with an alumina gel. The mixed paste was extruded through a 1.4 mm diameter die. The amount of ZSM-23 zeolite with structure type MTT in the support (zeolite+matrix) was 80% by weight.

Platinum was deposited using a solution of a platinum salt, $H_2PtCl_6$, to obtain a platinum content of 0.5% by weight on the support. The catalyst obtained was termed C1. The dispersion of the platinum, measured by $H_2/O_2$ titration after calcining at 450° C. in dry air and reduction in hydrogen at 420° C., was about 82%.

EXAMPLE 10

Catalytic Evaluation of Catalyst C1 in Hydroisomerisation of n-heptane.

Prior to its catalytic evaluation, catalyst C1 was calcined at 450° C. in dry air for 4 hours. The temperature rise was carried out at a rate of 5° C./minute with two constant temperature stages lasting one hour at 150° C. and 300° C.

The metallic phase was reduced in situ in the catalytic reactor just before the catalytic test was carried out.

The reduction conditions for the three catalysts were as follows:

temperature rise at 7° C./minute up to 150° C. in a stream of hydrogen, constant temperature stage of 30 minutes;
then raising the temperature, again at 7° C./minute, up to 300° C. in a stream of hydrogen, constant temperature stage of 30 minutes;
finally, raising the temperature at 7° C./minute up to 450° C. in a stream of hydrogen, constant temperature stage of 60 minutes.

The temperature was then reduced to the reaction temperature, namely 230° C. the catalytic tests were carried out in a fixed bed reactor in the gas phase. The molecule isomerised (hydroisomerised) in the presence of hydrogen was n-heptane (99.9% pure) and the mole ratio used in the various catalytic tests of the hydrogen to the n-heptane was 2. The space velocity, i.e., the mass of n-heptane injected per gram of catalyst per hour, was 2.4 $h^{-1}$.

The produced formed were $C_1$ to $C_6$ cracking products or products containing 7 carbon atoms per molecule, or aromatic products from n-heptane aromatisation reactions.

The catalytic results obtained are shown in the following table:

| % by weight | Catalyst C1 containing ZSM-23 zeolite, in accordance with the invention |
|---|---|
| n-$C_7$ conversion | 73 |
| Yield of $C_1$–$C_6$ cracking products | 14 |
| Isomerisation yield | 59 |

This table shows that using a catalyst comprising ZSM-23 zeolite of the invention (catalyst C1) can effect n-heptane hydroisomerisation.

What is claimed is:

1. A process for preparing a zeolite with structure type MTT comprising at least one element X selected from silicon and germanium and at least one element T selected from iron, aluminium, gallium, boron, titanium, vanadium, zirconium, molybdenum, arsenic, antimony, chromium and manganese, said process comprising crystallizing a reaction mixture containing seeds of at least one zeolitic material comprising at least one element X' selected from silicon and germanium and at least one element T' selected from iron, aluminium, gallium, boron, titanium, vanadium, zirconium, molybdenum, arsenic, antimony, chromium and manganese, with an X'/T' ratio of less than 200, said seeds being different from the zeolite with structure type MTT being prepared, said reaction mixture further containing at least one organic template, said organic template being an alkylated α-ω diammonium polymethylene derivative with formula: $R_1R_2R_3N^+(CH_2)_nN^+R_4R_5R_6$, and/or a degradation product of the amine corresponding to said derivative and/or a precursor corresponding to said derivative, n being in the range 3 to 14 and $R_1$ to $R_6$, which may be identical or different, representing alkyl or hydroxyalkyl radicals containing 1 to 8 carbon atoms; up to five $R_1$ to $R_6$ radicals optionally being hydrogen.

2. A process according to claim 1, in which the structure type of the zeolitic material seeds is different from structure type MTT.

3. A process according to claim 1, in which the chemical composition of the crystalline framework of the seeds is different from the chemical composition of the crystalline framework of the zeolite with structure type MTT being prepared.

4. A process according to claim 1, in which the zeolitic material used as a seed is at least one selected from the group consisting of zeolites having structure type LTA, structure type LTL, structure type FAU, structure type MOR, structure type MAZ, structure type OFF, structure type FER, structure type ERI, structure type BEA, structure type MFI, structure type MTW, structure type EUO, structure type LEV, structure type TON, structure type NES and structure type MTT with a chemical composition of the crystalline framework which is different from that of the MTT zeolite being prepared.

5. A process according to claim 1, in which the seeds used comprise at least one zeolitic material having a structure type LTA, FAU, MOR, MFI or MTT.

6. A process according to claim 1, in which the seeds of zeolitic material are introduced at any time during the preparation.

7. A process according to claim 1, in which the seeds of zeolitic material are introduced after at least partial homogenization of an aqueous mixture containing a source of the element X, a source of the element T and a source of the organic template.

8. A process according to claim 1, in which the element X is silicon and element T is aluminium.

9. A process according to claim 1, in which at least one alkali metal or ammonium P salt is introduced with the reaction mixture.

10. A process according to claim 1, in which the reaction mixture has the following composition, expressed in the oxide form:

| | |
|---|---|
| $XO_2/T_2O_3$ (mol/mol) | at least 10 |
| $OH^-/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0.0001 to 0.1 | where

X is silicon and/or germanium;

T is at least one of aluminium, iron, gallium, boron, titanium, vanadium, zirconium, molybdenum, arsenic, antimony, chromium and manganese;

$M^+$ represents an alkali metal or an ammonium ion;

Q represents the organic template or said degradation product corresponding to said derivative or said precursor of said derivative;

S represents said zeolite seeds expressed in their as synthesized, dried, calcined or exchanged form with an X'/T' ratio of less than 200;

P represents an alkali metal or ammonium salt.

11. A process according to claim 2, wherein the zeolitic material comprises at least one zeolite selected from the group consisting of zeolite A, zeolite X, zeolite Y, ZSM-5, NU-87, NU-85, NU-86, NU-88, and IM-5-zeolite.

12. A process including stages of forming a crystallized zeolite with structure type MTT comprising at least one element X selected from silicon and germanium and at least on element T selected from iron, aluminum, gallium, boron, titanium, vanadium, zirconium, molybdenum, arsenic, antimony, chromium and manganese; and hydroisomerizing paraffins with catalysts containing said crystallized zeolite with structure type MTT, said process comprising:

crystallizing a reaction mixture to form said zeolite with structure type MTT, said reaction mixture containing seeds of at least one zeolitic material comprising at least on element X' selected from silicon and germanium and at least one element T' selected from iron, aluminum, gallium, boron, titanium, vanadium, zirconium, molybdenum, arsenic, antimony, chromium, and manganese, with an X'/T' ratio of less than 200, said seeds being different from the crystallized zeolite MTT being prepared, said reaction mixture further containing at least one organic template, said organic template being an alkylated α-ω diammonium polymethylene derivative with the formula: $R_1R_2R_3N^+(CH_2)_nN^+R_4R_5R_6$, and/or a degradation product of the amine corresponding to said derivative and/or a precursor corresponding to said derivative, n being in the range of 3 to 14 and $R_1$ to $R_6$, which may be identical or different, representing alkyl or hydroxyalkyl radicals containing 1 to 8 carbon atoms; up to five $R_1$ to $R_6$ radicals possibly being hydrogen; and hydroisomerizing paraffins containing 6 to 10 carbon atoms per molecule in the presence of a catalyst comprising resultant crystallized zeolite, said hydroisomerizing being carried out at a temperature in the range 150° C. to 350° C., at a partial pressure of hydrogen in the range 0.1 to 7 MPa, at a space velocity in the range 0.2 to 10 liters of liquid hydrocarbons per liter of catalyst per hour, with a hydrogen/feed mole ratio at the reactor inlet such that the hydrogen/feed mole ratio in the effluent leaving the reactor is generally more than 0.01.

* * * * *

UNITED STATES PATENT AND TRADEMARK OFFICE
CERTIFICATE OF CORRECTION

PATENT NO.    : 6,475,464 B1
DATED         : November 5, 2002
INVENTOR(S)   : Loic Rouleau et al.

It is certified that error appears in the above-identified patent and that said Letters Patent is hereby corrected as shown below:

Column 12,
Line 8, reads "on element T" should read -- one element T --
Line 17, reads "on element X'" should read -- one element X' --

Signed and Sealed this

Eleventh Day of May, 2004

JON W. DUDAS
*Acting Director of the United States Patent and Trademark Office*